(12) United States Patent
Schmidt et al.

(10) Patent No.: US 7,479,515 B2
(45) Date of Patent: Jan. 20, 2009

(54) POLYPROPYLENE RESIN COMPOSITIONS

(75) Inventors: Hans-Werner Schmidt, Bayreuth (DE); Paul Smith, Zürich (CH); Markus Blomenhofer, Bayreuth (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 11/703,806

(22) Filed: Feb. 7, 2007

(65) Prior Publication Data

US 2007/0170398 A1 Jul. 26, 2007

Related U.S. Application Data

(63) Continuation of application No. 10/433,512, filed as application No. PCT/EP01/13791 on Nov. 27, 2001, now Pat. No. 7,235,191.

(60) Provisional application No. 60/251,396, filed on Dec. 6, 2000.

(51) Int. Cl.
  *C08K 5/20* (2006.01)
  *C07C 233/64* (2006.01)
(52) U.S. Cl. ...................... 524/210; 564/153
(58) Field of Classification Search .............. 524/210; 564/153
  See application file for complete search history.

(56) References Cited

U.S. PATENT DOCUMENTS

| | | | |
|---|---|---|---|
| 3,367,926 A | 2/1968 | Voeks | 260/93.5 |
| 3,852,237 A | 12/1974 | Osborn et al. | 260/42.21 |
| 3,903,160 A | 9/1975 | Dexter et al. | 564/153 |
| 4,016,118 A | 4/1977 | Hamada et al. | 260/17.4 |
| 4,294,747 A | 10/1981 | Su | 260/37 |
| 4,338,228 A | 7/1982 | Inoue et al. | 524/120 |
| 4,585,817 A | 4/1986 | Su et al. | 524/108 |
| 4,694,064 A | 9/1987 | Tomalia et al. | 528/332 |
| 4,749,736 A | 6/1988 | Khanna et al. | 524/230 |
| 5,137,973 A | 8/1992 | Khanna et al. | 525/177 |
| 5,198,484 A | 3/1993 | Mannion | 524/108 |
| 5,216,051 A | 6/1993 | Smith et al. | 524/108 |
| 5,278,216 A | 1/1994 | Asanuma et al. | 524/394 |
| 5,574,174 A | 11/1996 | Syed | 549/364 |

FOREIGN PATENT DOCUMENTS

| | | |
|---|---|---|
| EP | 0632095 | 1/1995 |
| EP | 0776933 | 6/1997 |
| EP | 0865911 | 9/1998 |
| EP | 0865914 | 9/1998 |
| EP | 0940431 | 9/1999 |
| JP | 0252655 | 12/1985 |
| JP | 07278374 | 10/1995 |
| WO | 95/13317 | 5/1995 |
| WO | 00/52089 | 9/2000 |

OTHER PUBLICATIONS

Derwent Abstr. 319045 for DE 1951632 (1971).
Derwent Abstr. 1995-401115 [51] for JP 07278374 (1995).
Derwent Abstr. 1994-260665 [32] for JP 06192496 (1994).
R. Gächter et al., Plastics Additives Handbook, 3$^{rd}$ Ed. (1990) pp. 863-875.
U. Johnsen et al., Die Angewandte Makromolekulare Chemie, Vol. 74, (May 1978), pp. 1-15, No. 1146.
A. Wlochowicz et al., Die Angewandte Makromolekulare Chemie, Vol. 171, (1989), pp. 78-89, No. 2741.
H. N. Beck et al., Journal of Applied Polymer Science, Vol. 11, pp. 673-685 (1967).
F. L. Binsbergen, Polymer, Vol. 11, pp. 253-267, (1970).
R. Schlotmann et al., Kunststoffe, Vol. 86, (1996), No. 7, pp. 1002-1006.
R. T. Morrison et al., Organic Chemistry, 2$^{nd}$ Ed., (Aug. 1966), p. 893.
Derwent Abstr. 86-032017/05 for JP 60252655 (1985).

*Primary Examiner*—Kriellion A Sanders
(74) *Attorney, Agent, or Firm*—Tyler A. Stevenson

(57) ABSTRACT

A polypropylene composition containing the components
  a) a crystallizable polypropylene homopolymer, random copolymer, alternating or segmented copolymer, block copolymer or a blend of polypropylene with another synthetic polymer, and
  b) 0.001 to 5%, relative to the weight of component a), of a specific trimesic acid derivative.

2 Claims, No Drawings

POLYPROPYLENE RESIN COMPOSITIONS

This application is a continuation of U.S. application Ser. No. 10/433,512 Jun. 03, 2003, now U.S. Pat. No. 7,235,191, which is a 371 of PCT/EP 01/13791, filed Nov. 27, 2001, which claims benefit of U.S. provisional app. No. 60/251,396, filed Dec. 6, 2000, the contents of which applications are incorporated by reference.

The present invention relates to polypropylene resin compositions having excellent crystallizability, high transmittance, high clarity, low haze and improved thermal stability, and containing trimesic acid derivatives, to the use of these trimesic acid derivatives as haze reducing agents, to mixtures of trimesic acid derivatives and to novel trimesic acid derivatives.

Polypropylene resin is widely applied in a variety of areas as the material of choice for film molding, sheet molding, blow molding, injection molding, and the like, because of its excellent processability and mechanical and electrical properties. Although the resin has a number of very useful characteristics, its crystallization behavior and optical properties are unattractive, which result in restricting application of this material, in particular in the packaging industry. Several attempts have been made to improve the crystallizability, transmittance and clarity, and reduce haze of polypropylene, notably by the addition of nucleating agents and clarifiers.

Nucleating agents and clarifiers are commonly used in industrial practice in combination with crystallizable thermoplastic polymers to reduce processing cycle times or to impart improved physico-chemical characteristics, such as various optical, surface and mechanical properties, as well as to reduce mold shrinkage. Elaborate lists of nucleating agents and clarifiers can be found in, for example, U.S. Pat. No. 3,367,926, Plastics Additives Handbook (4th Ed. Hanser, Munich, 1990, p. 863). Typical nucleating agents known in the art are metallic salts of aliphatic or aromatic carboxylic acids, aromatic salts, metallic salts of aromatic phosphorus compounds, quinacridones, pigments, polymers having melting points, highly branched polymers containing dendritic branches (dendrimers), and minerals such as chalk, gypsum, clay, kaolin, mica, talc and silicates, as well as combinations thereof (U.S. Pat. No. 5,278,216, U.S. Pat. No. 5,137,973, U.S. Pat. No. 4,749,736, U.S. Pat. No. 4,694,064, U.S. Pat. No. 4,338,228, U.S. Pat. No. 3,852,237; U. Johnsen and K.-H. Moos, Angew. Makromol. Chem, vol. 74, p. 1 (1978); A. Wlochowicz and M. Eder, Angew. Makromol. Chem, vol. 171, p. 79 (1989); H. N. Beck, J. Appl. Polym. Sci., vol. 11, p. 673 (1967); F. L. Binsbergen, Polymer, vol. 11, p. 253 (1970)). In addition, DE-A-1,951,632 discloses the use of solid, crystalline aromatic carboxilicimide-diphthalimides and N-substituted aromatic carboxylic imide-diphthalimides.

More recently developed nucleating agents and clarifiers dissolve in the polymer melt (R. Schlotmann and R. Walker, Kunststoffe, vol. 86, p. 1002 (1996)), which was found to be effective for improving dispersion of these additives. Most popular have become compounds that are based on D-sorbitol, which belongs to the general chemical family of carbohydrates, that is defined as polyhydroxy aldehydes, polyhydroxy ketones, or compounds that can be hydrolyzed to them (R. T. Morrion and Robert Neilson Boyd, Organic Chemistry, 2nd. Ed., (Allyn and Bacon, Inc., Boston), 1966, p. 983). There are several commercial nucleators based on sorbitol including 1,3-2,4-di(benzylidene)-D-sorbitol (Millad 3905 (RTM), Milliken Chemical Co. (RTM)); 1,3-2,4-di(4-tolylidene)-D-sorbitol (Millad 3940 (RTM), Milliken Chemical Co. (RTM)); 1,3-2,4-(3,4-dimethylbenzylidene)-D-sorbitol (Millad 3988 (RTM), Milliken Chemical Co. (RTM)); 1,3-2,4-di(4-ethylbenzylidene)-D-sorbitol (N-4, Mitsui Petrochemical Industries, Ltd. (RTM)). U.S. Pat. Nos. 5,574,174, 5,198,484 and WO-A-95/13317 disclose the preparation and use of sorbitol derivatives. U.S. Pat. No. 4,294,747 discloses polyhydric alcohol acetals of benzaldehyde and derivatives thereof. U.S. Pat. No. 5,216,051 describes triacetal polyol compounds. Use of dibenzylidene sorbitol (U.S. Pat. No. 4,016,118) in combination with phenyl phosphate compounds is disclosed in U.S. Pat. No. 4,585,817. Despite wide-spread commercial application, there exist a number of difficulties that are associated with carbohydrate-based compounds as nucleating and clarifying agents. First, the preparation and purification of sorbitol-based nucleating agents is cumbersome. Another of the well-known difficulties associated with the use of sorbitol clarifying agents in, for example, polyolefins resins is the formation of small bubbles in articles fabricated from these resins, which appear as white points (U.S. Pat. No. 5,198,484). Finally, among other disadvantages is their unsatisfactory temperature stability that is inherent to this class of materials.

The above compounds are either ineffective in simultaneously improving crystallizability and transmittance and clarity and haze of polypropylene resin, or exhibit insufficient heat resistance during processing, which is undesirable and may cause degradation and/or sublimation of the additive and promote degradation of the polymer.

Thus, a demand for further improvement of nucleating agents and clarifiers continues to exist. JP-A-Hei 7/278,374 describes a polypropylene resin composition containing tricarballytic acid-type amide compounds and having high crystallization temperature and improved transparency.

Several trimesic acid derivatives are known in the art, and their use as nucleating agents for polypropylene resins has been suggested for example in EP-A-940,431. Although principally directed to enhancement of rigidity of polypropylene resin, in JP-A-Hei06/192,496 it has been suggested that these compounds may impart improved transparency. However, no mention is made or suggested of improved transmittance or clarity or reduced haze, which are entirely different properties, and not naturally and necessarily are synonymous with improved transparency. As background, it is noted that haze determines the turbidity, and clarity the resolution or sharpness of the image of an object that is placed behind a film or plaque of the resin, while transmittance is associated with the amount of light that reaches the observer.

It has not been taught in the art, which among the enormous variety of trimesic acid derivatives known as nucleating agents for polypropylene resins enhance the transmittance, which ones improve clarity, which ones reduce haze and which compounds simultaneously impart all of these highly desirable properties to polypropylene.

The present invention relates in particular to a polypropylene composition containing the components
  a) a crystallizable polypropylene homopolymer, random copolymer, alternating or segmented copolymer, block copolymer or a blend of polypropylene with another synthetic polymer, and
  b) 0.001 to 5%, relative to the weight of component a), of a compound of the formula (I)

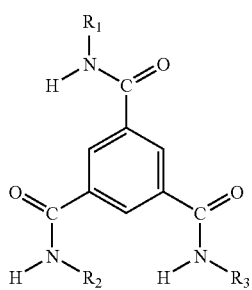

(I)

wherein
$R_1$, $R_2$ and $R_3$, independently of one another, are
$C_1$-$C_{20}$alkyl,
$C_1$-$C_{20}$alkyl substituted by $C_1$-$C_{20}$alkylamino, di($C_1$-$C_{20}$alkyl)amino, $C_1$-$C_{20}$alkyloxy or hydroxy;
{poly($C_2$-$C_4$alkoxy)}-($C_2$-$C_4$alkyl),
$C_2$-$C_{20}$alkenyl,
$C_3$-$C_{12}$cycloalkyl,
$C_3$-$C_{12}$cycloalkyl substituted by 1, 2 or 3 $C_1$-$C_{20}$alkyl;
cyclohexylmethyl;
cyclohexylmethyl substituted by 1, 2 or 3 $C_1$-$C_{20}$alkyl;
$C_3$-$C_{12}$cycloalkenyl,
$C_3$-$C_{12}$cycloalkenyl substituted by 1, 2 or 3 $C_1$-$C_{20}$alkyl;
phenyl,
phenyl substituted by 1, 2 or 3 radicals selected from the group consisting of $C_1$-$C_{20}$alkyl, $C_1$-$C_{20}$alkyloxy, hydroxy, halogen, trihalogenmethyl, trihalogenmethoxy, benzoyl, phenylamino, acylamino and phenylazo;
phenyl substituted by 5 halogen,
$C_7$-$C_9$phenylalkyl,
$C_7$-$C_9$phenylalkyl which is substituted on the phenyl by 1, 2 or 3 radicals selected from the group consisting of $C_1$-$C_{20}$alkyl, $C_1$-$C_{20}$alkoxy and hydroxy;
naphthyl,
naphthyl substituted by $C_1$-$C_{20}$alkyl;
adamantyl,
adamantyl substituted by $C_1$-$C_{20}$alkyl; or
a 5 to 6 membered heterocyclic group;

characterized in that the polypropylene composition has a haze value which is smaller than 62%, preferably smaller than 40%; the haze value being measured at a plate of 1.1-1.2 mm thickness. In this case, the clarity determined as described in the working examples is e.g. larger than 50%, preferably larger than 90%.

The polypropylene compositions according to the present invention also show a high transmittance which means for example a transmittance of more than 80% or 85%, preferably 80 to 98%, 85 to 92% or 83 to 95%.

The crystallization temperature of the polypropylene composition according to the present invention is in general higher than the crystallization temperature of a corresponding polypropylene composition without component b).

Examples of $C_1$-$C_{20}$alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methyl-hexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methyl-undecyl, dodecyl, 1,1,3,3,5,5-hexamethylhexyl, tridecyl, tetradecyl, pentadecyl, hexadecyl, heptadecyl, octadecyl and eicosyl.

Preferred examples are isopropyl, n-butyl, sec-butyl, tert-butyl, n-pentyl, 1,1-dimethylpropyl, 1,2-dimethylpropyl, 3-methylbutyl, n-hexyl, n-heptyl, n-octyl, 2-ethylhexyl, tert-octyl (1,1,3,3-tetramethylbutyl), isononyl, n-dodecyl, tridecyl or the tallow alkyl mixture. Tert-butyl, 3-methylbutyl, 1,2-dimethylpropyl and tert-octyl are particularly preferred.

Examples of $C_1$-$C_{20}$alkyl substituted by $C_1$-$C_{20}$alkylamino, di($C_1$-$C_{20}$alkyl)amino, $C_1$-$C_{20}$alkyloxy or hydroxy are 3-methylaminopropyl, 2-dimethylaminoethyl, 2-diethylaminoethyl, 3-dimethylaminopropyl, 3-diethylaminopropyl, 2-methoxyethyl, 2-ethoxyethyl, 2-methoxypropyl, 2-ethoxypropyl, 3-isopropoxypropyl and hydroxyethyl.

An example of {poly($C_2$-$C_4$alkoxy)}-($C_2$-$C_4$alkyl) is {polypropylene oxide}propyl.

Examples of $C_2$-$C_{20}$alkenyl are allyl, 2-methallyl, butenyl, pentenyl, hexenyl and oleyl. The carbon atom in position 1 is preferably saturated. Particularly preferred examples are allyl and oleyl.

Examples of $C_3$-$C_{12}$cycloalkyl are cyclopropyl, cyclobutyl, cyclopentyl, cyclohexyl, cycloheptyl, cyclooctyl and cyclododecyl.

Preferred examples are cyclopentyl and cyclohexyl.

A preferred example of $C_3$-$C_{12}$cycloalkyl substituted by 1, 2 or 3 $C_1$-$C_{20}$alkyl is 2-methylcyclohexyl.

An example of cyclohexylmethyl substituted by 1, 2 or 3 $C_1$-$C_{20}$alkyl is methylcyclohexylmethyl.

An example of $C_3$-$C_{12}$cycloalkenyl is cyclohexenyl.

An example of $C_3$-$C_{12}$cycloalkenyl substituted by 1, 2 or 3 $C_1$-$C_{20}$alkyl is methylcyclohexenyl.

Examples of phenyl substituted by 1, 2 or 3 radicals selected from the group consisting of $C_1$-$C_{20}$alkyl, $C_1$-$C_{20}$alkyloxy, hydroxy, halogen, trihalogenmethyl, trihalogenmethoxy, benzoyl, phenylamino, acylamino and phenylazo are 4-methylphenyl, 2-ethylphenyl, 4-ethylphenyl, 4-isopropylphenyl, 4-tert-butylphenyl, 4-sec-butylphenyl, 4-isobutylphenyl, dodecylphenyl, 3,5-dimethylphenyl, 3,4-dimethylphenyl, 2,4-dimethylphenyl, 2,6-diethylphenyl, 2-ethyl-6-methylphenyl, 2,6-diisopropylphenyl, 4-methoxyphenyl, 4-ethoxyphenyl, 4-hydroxyphenyl, 4-fluorophenyl, 3,5-difluorophenyl, 2-chlorophenyl, 3-chlorophenyl, 3-chloro-6-methylphenyl, 3,5-di(trifluoromethyl)phenyl, 4-trifluoromethoxyphenyl, 2-benzoylphenyl, 4-phenylaminophenyl, 4-acetamidophenyl and 4-(phenylazo)phenyl.

Halogen is preferably fluorine or chlorine.

An example of phenyl substituted by 5 halogens is pentafluorophenyl.

Examples of $C_7$-$C_9$phenylalkyl are benzyl and 2-phenylethyl.

Examples of $C_7$-$C_9$phenylalkyl which is substituted on the phenyl by 1, 2 or 3 radicals selected from the group consisting of $C_1$-$C_{20}$alkyl, $C_1$-$C_{20}$alkoxy and hydroxy are methylbenzyl, dimethylbenzyl, trimethylbenzyl, tert-butylbenzyl, methoxybenzyl and 3,5-di-tert-butyl-4-hydroxybenzyl.

An example of naphthyl substituted by $C_1$-$C_{20}$alkyl is methylnaphthyl.

An example of adamantyl substituted by $C_1$-$C_{20}$alkyl is methyladamantyl.

Examples of a 5 to 6 membered heterocyclic group are 2-picolyl, (2-furyl)methyl, (2-tetrahydrofuryl)methyl, 2-pyrimidyl, 6-methyl-2-pyridyl, 1,2,4-triazol-3-yl and 2-(1-piperazinyl)ethyl.

The haze is determined according to ASTM D 1003. Haze is defined as that percentage transmitted light which in passing through a specimen (plate) deviates from the incident beam by more than 2.5° on the average. Clarity is evaluated in the angle range smaller than 2.5°. The specimen shall have substantially plane-parallel surfaces free of dust, grease, scratches, and blemishes, and it shall be free of distinct internal voids and particles.

A polypropylene composition which is characterized by a haze of 3 to 62% is preferred. In this case, the clarity determined as described in the working examples is e.g. 50 to 99.9%, for example 60 to 99.9%, 70 to 99.9%, 80 to 99.9%, 90 to 99.9%, 95 to 99.9% or 95 to 99%.

A polypropylene composition which is characterized by a haze of 3 to 50% is of further interest. In this case, the clarity determined as described in the working examples is e.g. 80 to 99.9%, preferably 95 to 99.9% or 95 to 99%.

A polypropylene composition which is characterized by a haze of 3 to 40% is particularly preferred. In this case, the clarity determined as described in the working examples is e.g. 90 to 99.9%, preferably 95 to 99.9% or 95 to 99%.

A polypropylene composition which is characterized by a haze of 25 to 40% is also of interest. In this case, the clarity determined as described in the working examples is e.g. 95 to 99.9%, for example 95 to 99% or 97 to 99%.

Examples of haze are 3 to 55%, 3 to 50%, 3 to 45%, 3 to 40%, 3 to 35%, 3 to 30%, 5 to 55%, 5 to 50%, 5 to 45%, 5 to 40%, 5 to 35%, 5 to 30%, 7 to 55%, 7 to 50%, 7 to 45%, 7 to 40%, 7 to 35%, 7 to 30%, 10 to 55%, 10 to 50%, 10 to 45%, 10 to 40%, 10 to 35%, 10 to 30%, 15 to 55%, 15 to 50%, 15 to 45%, 15 to 40%, 15 to 35%, 15 to 30%, 20 to 55%, 20 to 50%, 20 to 45%, 20 to 40%, 20 to 35% and 20 to 30%. In this case, the clarity determined as described in the working examples is e.g. 95 to 99.9%.

According to a preferred embodiment of the present invention component a) is a polypropylene homopolymer.

Polypropylene homopolymer also covers long chain branched polypropylene.

Polypropylene, can be prepared by different, and especially by the following, methods:

Catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

When component a) is a Ziegler-Natta homo polypropylene, the polypropylene composition according to the present invention has preferably a haze of 5 to 40% or 10 to 40%, in particular 15 to 40%, 20 to 40% or 25 to 40%. In this case, the clarity determined according to the working examples is e.g. 90 to 99.9%, in particular 90 to 99%, 95 to 99.9% or 95 to 99%.

When component a) is a Ziegler-Natta polypropylene copolymer, the polypropylene composition according to the present invention has preferably a haze of 4 to 40%, in particular 4 to 30%, 4 to 20% or 4 to 15%. In this case, the clarity determined according to the working examples is e.g. 90 to 99.9%, in particular 90 to 99%, 95 to 99.9% or 95 to 99%.

When component a) is a metallocene homo polypropylene, the polypropylene composition according to the present invention has preferably a haze of 5 to 30%, in particular 5 to 20%, 5 to 15% or 5 to 10%. In this case, the clarity determined according to the working examples is e.g. 90 to 99.9%, in particular 90 to 99%, 95 to 99.9% or 95 to 99%.

When component a) is a metallocene polypropylene copolymer, the polypropylene composition according to the present invention has preferably a haze of 3 to 25%, in particular 3 to 20%, 3 to 15%, 3 to 10% or 3 to 8%. In this case, the clarity determined according to the working examples is e.g. 90 to 99.9%, in particular 90 to 99%, 95 to 99.9% or 95 to 99%.

According to a further preferred embodiment of the present invention, component a) is a polypropylene random copolymer, alternating or segmented copolymer or block copolymer containing one or more comonomers selected from the group consisting of ethylene, $C_4$-$C_{20}$-α-olefin, vinylcyclohexane, vinylcyclohexene, $C_4$-$C_{20}$alkandiene, $C_5$-$C_{12}$cycloalkandiene and norbornene derivatives; the total amount of propylene and the comonomer(s) being 100%.

Polypropylene copolymer also covers long chain branched polypropylene copolymer.

Examples of suitable $C_4$-$C_{20}$α-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene and 4-methyl-1-pentene.

Examples of suitable $C_4$-$C_{20}$alkandienes are hexadiene and octadiene.

Examples of suitable $C_5$-$C_{12}$cycloalkandienes are cyclopentadiene, cyclohexadiene and cyclooctadiene.

Examples of suitable norbornene derivatives are 5-ethylidene-2-norbornene (ENB), dicyclopentadiene (DCP) and methylene-domethylene-hexahydronaphthaline (MEN).

A propylene/ethylene copolymer contains for example 50 to 99.9%, preferably 80 to 99.9%, in particular 90 to 99.9%, by weight of propylene.

A propylene copolymer wherein the comonomer is a $C_9$-$C_{20}$α-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) contains preferably more than 90 mol %, in particular 90 to 99.9 mol % or 90 to 99 mol %, of propylene.

A propylene copolymer wherein the comonomer is a $C_4$-$C_8$α-olefin such as e.g. 1-butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene contains preferably more than 80 mol %, in particular 80 to 99.9 mol % or 80 to 99 mol %, of propylene.

Further examples of component a) are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

Other examples of component a) are blends of polypropylene with propylene/ethylene copolymers, propylene/butylene copolymers, polyethylene, e.g. HDPE or LDPE; polybutene, polyisobutylene, poly-4-methylpentene or alternating or random polyalkylene/carbon monoxide copolymers. These blends contain preferably at least 50% by weight, relative to the weight of the total blend, of polypropylene.

According to one of the preferred embodiments of the present invention the radicals $R_1$, $R_2$ and $R_3$ in the formula (I) are identical.

Polypropylene compositions wherein $R_1$ and $R_2$ are identical and $R_3$ is different from $R_1$ and $R_2$ are also preferred.

Of interest is a polypropylene composition wherein $R_1$, $R_2$ and $R_3$, independently of one another, are
$C_1$-$C_{18}$alkyl,
$C_1$-$C_{10}$alkyl substituted by $C_1$-$C_4$alkylamino, di($C_1$-$C_4$alkyl) amino or $C_1$-$C_4$alkyloxy;
{poly($C_2$-$C_4$alkoxy)}-($C_2$-$C_4$alkyl),
$C_3$-$C_{18}$alkenyl,
$C_5$-$C_6$cycloalkyl,
$C_5$-$C_6$cycloalkyl substituted by 1, 2 or 3 $C_1$-$C_4$alkyl;
cyclohexylmethyl;
cyclohexylmethyl substituted by 1, 2 or 3 $C_1$-$C_4$alkyl;
phenyl,
phenyl substituted by 1, 2 or 3 radicals selected from the group consisting of $C_1$-$C_4$alkyl,
$C_1$-$C_4$alkyloxy, hydroxy, halogen, benzoyl, phenylamino, $C_1$-$C_4$alkanoylamino and phenylazo;
benzyl,
benzyl which is substituted on the phenyl by 1, 2 or 3 radicals selected from the group consisting of $C_1$-$C_4$alkyl, $C_1$-$C_4$alkoxy and hydroxy;
phenylethyl,
phenylethyl which is substituted on the phenyl by 1, 2 or 3 radicals selected from the group consisting of $C_1$-$C_4$alkyl, $C_1$-$C_4$alkoxy and hydroxy;
naphthyl,
naphthyl substituted by $C_1$-$C_4$alkyl;
adamantyl,
adamantyl substituted by $C_1$-$C_4$alkyl; or
a 5 to 6 membered heterocyclic group.

Of further interest is a polypropylene composition wherein $R_1$ and $R_2$, independently of one another, are
$C_3$-$C_8$alkyl,
$C_5$-$C_6$cycloalkyl,
cyclohexylmethyl,
$C_5$-$C_6$cycloalkyl substituted by 1, 2 or 3 $C_1$-$C_4$alkyl; or
adamantyl.

Also of interest is a polypropylene composition wherein $R_1$, $R_2$ and $R_3$, independently of one another, are
$C_3$-$C_8$alkyl,
$C_5$-$C_6$cycloalkyl,
cyclohexylmethyl,
$C_5$-$C_6$cycloalkyl substituted by 1, 2 or 3 $C_1$-$C_4$alkyl; or
adamantyl.

$R_1$, $R_2$ and $R_3$ are preferably identical and are
isopropyl, 2-methylpropyl, 1-ethylpropyl, 1,1-dimethylpropyl, 1,2-dimethylpropyl, n-butyl, 2-butyl, tert-butyl, 3-methylbutyl, 1,1,3,3-tetramethylbutyl, cyclobutyl, cyclopentyl, cyclohexyl, 2-methylcyclohexyl, 4-methylcyclohexyl, cyclohexylmethyl, 3,3,5-trimethylcyclohexyl or 1-adamantyl; in particular isopropyl, 2-methylpropyl, 1,1-dimethylpropyl, 1,2-dimethylpropyl, 2-butyl, tert-butyl, 3-methylbutyl, 1,1,3,3-tetramethylbutyl, cyclopentyl, cyclohexyl, 2-methylcyclohexyl, cyclohexylmethyl or 1-adamantyl.

According to a further preferred embodiment of the present invention
$R_1$, $R_2$ and $R_3$ are identical and are
isopropyl, 2-butyl, tert-butyl, cyclopentyl, cyclohexyl, 2-methylcyclohexyl or 1-adamantyl.

According to another preferred embodiment of the present invention
$R_1$, $R_2$ and $R_3$ are identical and are
1,2-dimethylpropyl, tert-butyl, 3-methylbutyl, 1,1,3,3-tetramethylbutyl, cyclopentyl or cyclohexyl.

According to a particularly preferred embodiment of the present invention
$R_1$, $R_2$ and $R_3$ are identical and are
1,2-dimethylpropyl, 3-methylbutyl or cyclopentyl.

Component b) is preferably 0.01 to 5%, for example 0.01 to 2%, 0.05 to 1%, 0.1 to 1% or 0.15 to 1%, relative to the weight of component a), of a compound of the formula (I).

A further preferred embodiment of the present invention relates to a polypropylene composition containing as additional component c) 0.001 to 5%, preferably 0.01 to 5%, relative to the weight of component a), of a conventional nucleating agent.

Examples of conventional nucleating agents are
1) Aromatic sorbitol acetals, for example
    1,3:2,4-bis(benzylidene)sorbitol, commercially available as Irgaclear D (RTM), Millad 3905 (RTM) and Gel All D (RTM).
    1,3:2,4-bis(4-methylbenzylidene)sorbitol, commercially available as Irgaclear DM (RTM), Millad 3940 (RTM), NC-6 (Mitsui (RTM)) and Gel All MD (RTM).
    1,3:2,4-bis(3,4-dimethylbenzylidene)sorbitol, commercially available as Millad 3988 (RTM).
    1,3:2,4-bis(4-ethylbenzylidene)sorbitol, commercially available as NC-4 (Mitsui (RTM))
2) Nucleating agents based upon salts of phosphoric acid, for example
    2,2'-Methylen-bis-(4,6-di-tert-butylphenyl)phosphate, commercially available as Adeka Stab NA11 (RTM) and Adeka Stab NA21 (RTM).
3) Nucleating agents based upon salts of carboxylic acid, for example sodium benzoate.
4) Nucleating agents based upon carboxy aluminum-hydroxide, for example aluminum hydroxy-bis[4-(tert-butyl)benzoate], commercially available as Sandostab 4030 (RTM).
5) Nucleating agents based upon salts of rosin/adiebetic acid, for example
    Pinecrystal KM-1300 (RTM).
    Pinecrystal KM-1600 (RTM).
6) Other nucleating agents, for example Zinc (II) monoglycerolate commercially available as Prifer 3888 (RTM) and Prifer 3881 (RTM).

A further embodiment of the present invention is a method for providing a resin with a haze value which is smaller than 62%; the haze value being measured at a plate of 1.1-1.2 mm thickness; said resin being selected from the group consisting of a crystallizable polypropylene homopolymer, random copolymer, alternating or segmented copolymer, block copolymer and a blend of polypropylene with another synthetic polymer; which method comprises incorporating into the resin 0.001 to 5%, relative to the weight of the resin, of a compound of the formula (I) as defined above.

Another embodiment of the present invention is the use of a compound of the formula (I) as haze reducing agent for a crystallizable polypropylene homopolymer, random copolymer, alternating or segmented copolymer, block copolymer or a blend of polypropylene with another synthetic polymer.

Here, a normalized haze value (Haze$_{norm}$) is defined as indicated below.

$$Haze_{norm} = \frac{\text{Haze of a polypropylene composition according to the present invention}}{\text{Haze of the corresponding polypropylene composition without component } b)}$$

Examples of Haze$_{norm}$ are 5 to 95%, 10 to 95%, 20 to 95%, 30 to 95%, 40 to 95%, 50 to 95%, 60 to 95%, 70 to 95%, 80 to 95%, 5 to 85%, 10 to 85%, 20 to 85%, 30 to 85%, 40 to 85%, 50 to 85%, 60 to 85%, 70 to 85%, 80 to 85%, 5 to 80%, 10 to 80%, 20 to 80%, 30 to 80%, 40 to 80%, 50 to 80%, 60 to 80%, 70 to 80%, 5 to 75%, 10 to 75%, 20 to 75%, 30 to 75%, 40 to 75%, 50 to 75%, 60 to 75%, 70 to 75%, 5 to 70%, 10 to 70%, 20 to 70%, 30 to 70%, 40 to 70%, 50 to 70%, 60 to 70%, 5 to 60%, 10 to 60%, 20 to 60%, 30 to 60%, 40 to 60%, 50 to 60%, 5 to 55%, 10 to 55%, 20 to 55%, 30 to 55%, 40 to 55%, 50 to 55%, 5 to 50%, 10 to 50%, 20 to 50%, 30 to 50%, 40 to 50%, 5 to 45% 10 to 45%, 20 to 45%, 30 to 45%, 40 to 45%, 5to 40%, 10 to 40%, 20 to 40%, 30 to 40%, 5 to 30%, 10 to 30%, 20 to 30%, 5 to 20% and 10 to 20%.

Haze$_{norm}$ is preferably 5 to 50%. Of particular interest is a Haze$_{norm}$ of 40 to 80%.

Another object of the present invention is a novel mixture containing the components b-1) a compound of the formula (I) as defined above, and
b-2) a further compound of the formula (I) as defined above;

the components b-1) and b-2) being different and the weight ratio of the components b-1) to b-2) being 1:100 to 100:1, for example 1:90 to 90:1, 1:80 to 80:1, 1:70 to 70:1, 1:60 to 60:1, 1:50 to 50:1, 1:40 to 40:1, 1:30 to 30:1, 1:20 to 20:1, 1:10 to 10:1, 1:5 to 5:1, 1:4 to 4:1, 1:3 to 3:1, 1:2 to 2:1 or 1:1.

This mixture may contain as additional component c) a conventional nucleating agent as described above; the weight ratio of the component c) to the sum of the components b-1) and b-2) being 1:20 to 20:1, for example 1:10 to 10:1, 1:5 to 5:1, 1:4 to 4:1, 1:3 to 3:1,1:2 to 2:1 or 1:1.

A further object of the present invention is a novel mixture containing the components b-1) a compound of the formula (I) as defined above,
b-2) a further compound of the formula (I) as defined above, and
b-3) an additional compound of the formula (I) as defined above;

the components b-1), b-2) and b-3) being different, and the weight ratio of the components b-1) to b-2) being 1:100 to 100:1, for example 1:90 to 90:1, 1:80 to 80:1, 1:70 to 70:1, 1:60 to 60:1, 1:50 to 50:1, 1:40 to 40:1, 1:30 to 30:1, 1:20 to 20:1, 1:10 to 10:1,1:5 to 5:1, 1:4 to 4:1, 1:3 to 3:1, 1:2 to 2:1 or 1:1, and the weight ratio of the component b-3) to the sum of the components b-1) and b-2) being 1:20 to 20:1, for example 1:10 to 10:1, 1:5 to 5:1,1:4 to 4:1, 1:3 to 3:1, 1:2 to 2:1 or 1:1.

The latter mixture may contain as an additional component c) a conventional nucleating agent as defined above; the weight ratio of the component c) to the sum of the components b-1), b-2) and b-3) being 1:20 to 20:1, for example 1:10 to 10:1,1:5 to 5:1,1:4 to 4:1, 1:3 to 3:1, 1:2 to 2:1 or 1:1.

Another object of the present invention is a mixture containing the components b) a compound of the formula (I), and
c) a conventional nucleating agent;

the weight ratio of the components b) and c) being 1:20 to 20:1, for example 1:10 to 10:1, 1:5 to 5:1, 1:4 to 4:1, 1:3 to 3:1, 1:2 to 2:1 or 1:1.

A further embodiment of the present invention relates to a composition containing a synthetic polymer, wax, oil or a blend of synthetic polymers and one of the novel mixtures described above.

Examples of synthetic polymers, waxes, oils or blends of synthetic polymers are

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated.

These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 619, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/ or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Crosslinked polymers derived from aldehydes on the one hand and phenols, ureas and melamines on the other hand, such as phenol/formaldehyde resins, urea/formaldehyde resins and melamine/formaldehyde resins.
23. Drying and non-drying alkyd resins.
24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Cellulose acetates, cellulose propionates and cellulose butyrates, or the cellulose ethers such as methyl cellulose; as well as rosins and their derivatives.
29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The above items 1 to 3 are preferred.

The resin compositions of the present invention may be prepared by standard procedures, well known to those skilled in the art, of compounding, such as mixing the prescribed components in a conventional mixer and melting and kneading the mixture with a single- or twin-screw extruder, or the like.

To the resin compositions of the present invention, additional materials can be added in a concentration range that does not adversely affect the beneficial effects of the invention. These materials may include stabilizers, antioxidants, antibacterial agents, ultraviolet absorbers, thermostabilizers, light stabilizers, neutralizers, antistatic agents, antiblocking agents, heavy metal inactivation agents, flame retardants, lubricants, peroxides, hydrotalcite, foaming agents, elastomers, processing aids, additional nucleating agents, and the like and mixtures thereof.

More detailed examples of these conventional additives are listed below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis [6-(α-methyl-benzyl)-4-nonylphenol], 2,2'-methylenebis[6-(α,α-dimethylbenzyl)-4-nonylphenol], 4,4'-methy-lenebis (2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopenta-diene, bis[2-(3'-tert-butyl-2'-hydroxy-5'-methylbenzyl)-6-tert-butyl-4-methylphenyl]terephtha-late, 1,1-bis-(3,5-dimethyl-2-hydroxyphenyl)butane, 2,2-bis-(3,5-di-tert-butyl-4-hydroxyphe-nyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris (3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris-(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugarde® XL-1, supplied by Uniroyal).

1.18. Ascorbic Acid (Vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tertbutyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy-phenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

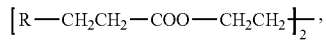

where R=3'-tert-butyl-4'-hydroxy-5'-2H-benzotriazol-2-ylphenyl, 2-[2'-hydroxy-3'-(α,α-dimethylbenzyl)-5'-(1,1,3, 3-tetramethylbutyl)phenyl]-benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)-resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl-undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6, 6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6, 6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5] decane-2,4-dione, bis(1-octyl-oxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl-)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6, 6-tetramethyl-4-piperidyl)hexamethylenediamine, a diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin-copolymer with 2,2,6, 6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[4-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)

phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)-hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl-alkyl phosphites, phenyl-dialkyl phosphites, tris(nonylphenyl) phosphite, trilauryl phosphite, trioctadecyl phosphite, distearyl-pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)-methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl )phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl)phosphite (Irgafoso® 168, Ciba-Geigy), tris(nonylphenyl)phosphite,

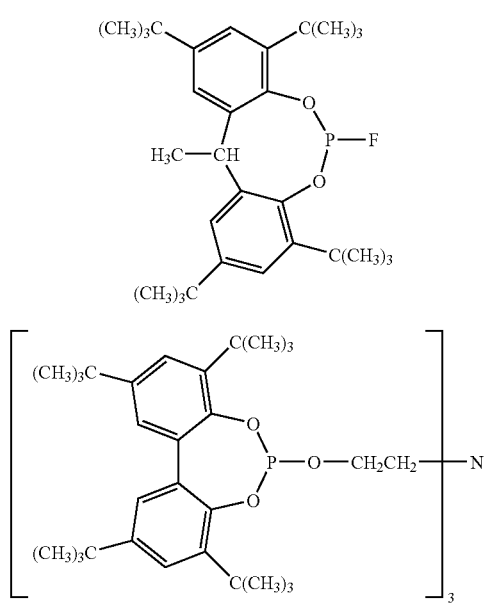

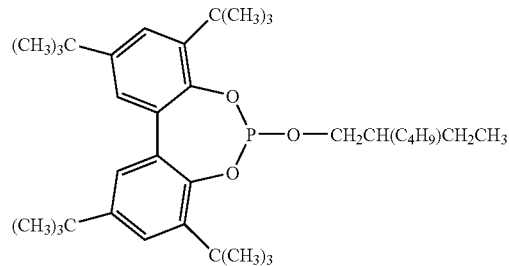

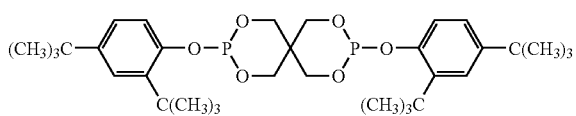

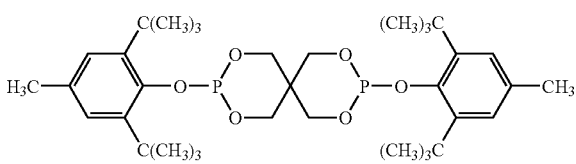

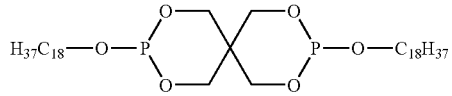

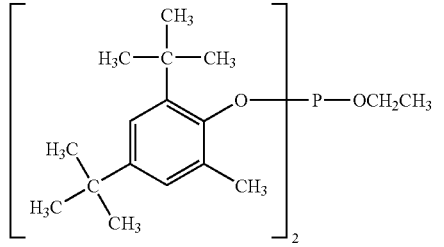

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyidithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Conventional nucleating agents, for example, inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Other additives, for example plasticisers, lubricants, rheology additives, catalysts, flow-control agents, optical brighteners, flameproofing agents, antistatic agents and blowing agents.

13. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The weight ratio of the above described component b) to the conventional additive is preferably 1:100 to 100:1, for example 1:90 to 90:1, 1:80 to 80:1, 1:70 to 70:1, 1:60 to 60:1, 1:50 to 50:1, 1:40 to 40:1, 1:30 to 30:1, 1:20 to 20:1, 1:10 to 10:1, 1:5 to 5:1, 1:4 to 4:1, 1:3 to 3:1, 1:2 to 2:1 or 1:1, The resin compositions according to the present invention can be advantageously used as resin materials for films, sheets, bottles, syringes, ordinary utensils, automotive parts, containers, parts for electrical appliances, fibers, nonwoven fabrics and the like, and are conveniently molded by a method suitable for the intended products, such as injection molding, extrusion molding, blow molding, or the like. More details are given below.

Some compounds of the formula (I) are novel. Thus, a further embodiment of the present invention relates to a compound of the formula (IA)

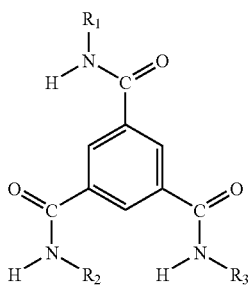

(IA)

wherein $R_1$ and $R_2$, independently of one another, are $C_1$-$C_{20}$alkyl, $C_1$-$C_{20}$alkyl substituted by $C_1$-$C_{20}$alkylamino, di($C_1$-$C_{20}$alkyl)amino, $C_1$-$C_{20}$alkyloxy or hydroxy;

{poly($C_2$-$C_4$alkoxy)}-($C_2$-$C_4$alkyl), $C_2$-$C_{20}$alkenyl, $C_3$-$C_{12}$cycloalkyl, $C_3$-$C_{12}$cycloalkyl substituted by 1, 2 or 3 $C_1$-$C_{20}$alkyl;

cyclohexylmethyl;

cyclohexylmethyl substituted by 1, 2 or 3 $C_1$-$C_{20}$alkyl;

$C_3$-$C_{12}$cycloalkenyl, $C_3$-$C_{12}$cycloalkenyl substituted by 1, 2 or 3 $C_1$-$C_{20}$alkyl;

phenyl, phenyl substituted by 1, 2 or 3 radicals selected from the group consisting of $C_1$-$C_{20}$alkyl, $C_1$-$C_{20}$alkyloxy, hydroxy, halogen, trihalogenmethyl, trihalogenmethoxy, benzoyl, phenylamino, acylamino and phenylazo;

phenyl substituted by 5 halogen, $C_7$-$C_9$phenylalkyl, $C_7$-$C_9$phenylalkyl which is substituted on the phenyl by 1, 2 or 3 radicals selected from the group consisting of $C_1$-$C_{20}$alkyl, $C_1$-$C_{20}$alkoxy and hydroxy;

naphthyl, naphthyl substituted by $C_1$-$C_{20}$alkyl;

adamantyl, adamantyl substituted by $C_1$-$C_{20}$alkyl; or a 5 to 6 membered heterocyclic group; and $R_3$ is 2-ethylhexyl, 3-methyl-1-butyl, 3-(dimethylamino)propyl, 3-(diethylamino)propyl, 3-(methylamino)propyl, 2-(ethoxy)ethyl, 3-(methoxy)propyl, 3-(ethoxy)propyl, 2-picolyl, furfuryl, tetrahydrofurfuryl, 2-pyrimidinyl, 4-(phenylamino)phenyl, 4-isopropylphenyl, 2-ethylphenyl, 2,4-diethylphenyl, 2-ethyl-6-methylphenyl, 2,6-diisopropylphenyl, 4-methoxyphenyl, 4-ethoxyphenyl, 1,2,4-triazol-3-yl or 4-(phenlyazo)phenyl.

$R_1$, $R_2$ and $R_3$ are preferably identical.

Another embodiment of the present invention relates to a compound of the formula (IB)

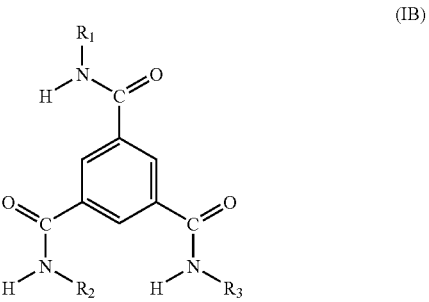

(IB)

wherein $R_1$, $R_2$ and $R_3$ are identical and are 3-methylphenyl, 2,3-dimethylphenyl, 2,4-dimethylphenyl, 3,4-dimethylphenyl, 2,4,6-trimethylphenyl, 2-ethylphenyl, 4-n-butylphenyl, 4-methoxyphenyl, 4-ethoxyphenyl, 4-(n-decyloxy)phenyl, cyclopropyl, cyclobutyl, cycloheptyl, 1-adamantyl, 3-methylcyclohexyl, 2,3-dimethylcyclohexyl, 3,3,5-trimethylcyclohexyl, S(+)-1-cyclohexylethyl, R(+)-1-cyclohexylethyl, isopropyl, 1,1-dimethylpropyl, 1,2-dimethylpropyl, 2-butyl, 3-methylbutyl, 1,1,3,3-tetramethylbutyl, 3,5-difluorophenyl, pentafluorophenyl or 4-(trifluoromethoxy)phenyl; preferably 1,2-dimethylpropyl, 3-methylbutyl or 1,1,3,3-tetramethylbutyl.

Another preferred embodiment of the present invention is a composition containing a synthetic polymer, wax, oil or a blend of synthetic polymers and one of the novel compounds described above.

The compounds of the formula (I) can be prepared in analogy to known processes, for example by reacting an appropriate amine with 1,3,5-benzenetricarboxylic acid trichloride as described for example in the standard works such as Houben-Weyl, Methoden der Organischen Chemie [Methods of Organic Chemistry], published by Georg Thieme, Stuttgart), under reaction conditions which are known. In carrying out these reactions, it is also possible to take advantage of variants known per se which are not specifically mentioned here. The starting substances can, if so desired also be formed in situ, by not isolating them out of the reaction mixture but immediately reacting them further to the compounds of the formula (I). Working Examples A to C describe a representative method of the preparation.

Examples of appropriate amines are:
isopropylamine,
n-butylamine,
sec-butylamine
tert-butylamine,
n-pentylamine,
1,1-dimethylpropylamine,
1,2-dimethylpropylamine,
3-methylbutylamine,
n-hexylamine,
n-heptylamine,
n-octylamine,
2-ethylhexylamine,
tert-octylamine(1,1,3,3-tetramethylbutylamine),
isononylamine,
n-dodecylamine,
tridecylamine,
tallowamine,
2-dimethylaminoethylamine,
2-diethylaminoethylamine,
3-dimethylaminopropylamine,
3-diethylaminopropylamine,
3-methylaminopropylamine,
Jeffamine(polypropylene oxide),
2-methoxyethylamine,
2-ethoxyethylamine,
2-methoxypropylamine,
2-ethoxypropylamine,
3-isopropoxypropylamine,
allylamine,
oleylamine,
cyclopentylamine,
cyclohexylamine,
2-methylcyclohexylamine,
cyclohexylmethylamine,
4-methylphenylamine (=4-methylaniline),
2-ethylphenylamine (=2-ethylaniline),
4-ethylphenylamine (=4-ethylaniline),
4-isopropylphenylamine (=4-isopropylaniline),
4-tert-butylphenylamine (=4-tert-butylaniline),
4-sec-butylphenylamine (=4-sec-butylaniline),
4-isobutylphenylamine (=4-isobutylaniline),
dodecylphenylamine (=dodecylaniline),
3,5-dimethylphenylamine (=3,5-dimethylaniline),
3,4-dimethylphenylamine (=3,4-dimethylaniline),
2,4-dimethylphenylamine (=2,4-dimethylaniline),
2,6-diethylphenylamine (=2,6-diethylaniline),
2-ethyl-6-methylphenylamine (=2-ethyl-6-methylaniline),
2,6-diisopropylphenylamine (=2,6-diisopropylaniline),
4-methoxyphenylamine (=4-methoxyaniline),
4-ethoxyphenylamine (=4-ethoxyaniline),
4-hydroxyphenylamine (=4-hydroxyaniline),
4-acetamidophenylamine (=4-acetamidoaniline),
3-chlorophenylamine (=3-chloroaniline),
2-chlorophenylamine (=2-chloroaniline),
3-chloro-6-methylphenylamine,
2-benzoylphenylamine (=2-benzoylaniline),
4-phenylaminophenylamine,
4-(phenylazo)phenylamine (=4-aminoazobenzene),
benzylamine,
2-phenylethylamine,
1-naphthylamine,
adamantylamine,
2-picolylamine,
(2-furyl)methylamine,
(2-tetrahydrofuryl)methylamine,
2-pyrimidylamine,
6-methyl-2-pyridylamine,
1,2,4-triazol-3-ylamine, and
2-(1-piperazinyl)ethylamine.

The following examples describe the present invention in greater detail.

Unless indicated otherwise, heretofore and hereinafter, all parts and percentages are by weight and all temperatures are given in degrees Celsius (° C.). "Customary working up" means: addition to water, filtration of precipitate, extracting with organic solvent and/or purifying the product by crystallization and/or chromatography.

EXAMPLE A

Preparation of the Compound of the Formula

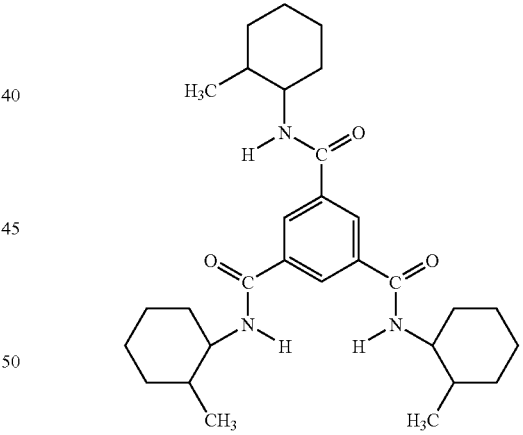

3.74 g (33 mmol) 2-methylcyclohexylamine and 0.1 g dry LiCl are added under inert atmosphere to 70 ml of dry N-methylpyrrolidinone (NMP) and 15 ml of dry pyridine and cooled to 5° C. Then, 2.39 g (9 mmol) 1,3,5-benzenetricarboxylic acid trichloride is added. The reaction mixture is heated to 75° C. and stirred. After 2 hours the reaction mixture is added to 300 ml of ice water. The precipitate is filtered off. Customary work-up (recrystallization) gives 1,3,5-benzenetricarboxylic acid tris(2-methylcyclohexylamide).

Yield: 2.68 g (5.41 mmol): 60.1%.

Melting Point: 414° C. (under simultaneous evaporation).

$^1$H-NMR (DMSO-$d_6$): δ=0.82-0.96 (2t, 9H); 0.98-1.88 (m, 27H); 3.45-3.60 and 4.01-4.17 (2m 3H); 8.16-8.33 (m, 3H); 8.42 (d, J=8.3 Hz, 3H).

$^{13}$C-NMR (CF$_3$COOD/CDCl$_3$ 1:1): δ=15.2; 18.7; 22.5; 22.7; 25.3; 25.5; 28.7; 30.0; 32.8; 33.5; 34.3; 37.7; 53.3; 57.6; 130.7; 134.2; 168.2; 168.4; 168.6; 168.

IR (KBr, cm$^{-1}$): 3226; 3060; 2929; 1637; 1555; 1250.

MS (70 eV). m/z (mass spectroscopy): 495 (M$^+$, 5%).

EXAMPLE B

Preparation of the Compound of the Formula

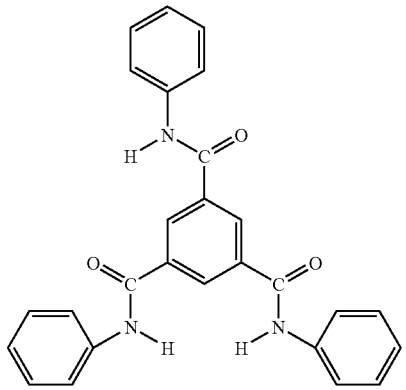

0.93 g (10 mmol) aniline and 0.1 g dry LiCl are added under inert atmosphere to 50 ml of dry NMP and 5 ml of dry pyridine and cooled to 5° C. 0.80 g (mmol) 1,3,5-benzenetricarboxylic acid trichloride is added. Then, the reaction mixture is heated to 75° C. and stirred. After 2 hours the reaction mixture is added to 100 ml of ice water. The precipitate is filtered off. Customary work-up (Soxhlet extraction) gives 1,3,5-benzenetricarboxylic acid tris(phenylamide).

Yield: 0.80 g (1.8 mmol): 61.2%.

Melting point: 312° C.

$^1$H-NMR (DMSO-d$_6$): δ=7.14 (t, J=7.2 Hz, 3H); 7.40 (dd, J$_1$=8.5 Hz, J$_2$=7.2 Hz, 6H); 7.82 (d, J=8.5 Hz, 6H); 8.71 (s, 3H); 10.59 (s, 3H).

$^{13}$C-NMR (CF$_3$COOD/CDCl$_3$ 1:1): δ=122.8; 127.6; 129.7; 131.3; 135.2; 135.9; 167.5.

IR (KBr, cm$^{-1}$): 3290; 3062; 1648; 1523; 1254.

MS (70 eV), m/z: 435 (M$^+$, 84%).

EXAMPLE C

Preparation of the Compound of the Formula

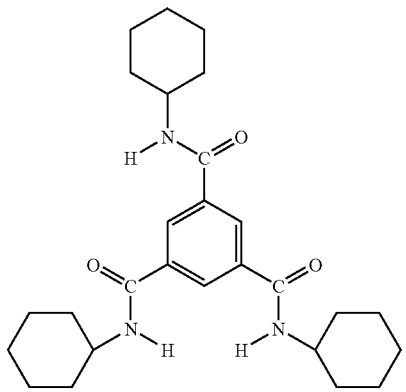

0.99 g (10 mmol) cyclohexylamine and 0.1 g dry LiCl are added under inert atmosphere to 30 ml of dry NMP and 5 ml of dry pyridine and cooled to 5° C. Then, 0.80 g (3 mmol) 1,3,5-benzenetricarboxylic acid trichloride is added. The reaction mixture is heated to 75° C. and stirred. After 2 hours the reaction mixture is added to 100 ml of ice water. The precipitate is filtered off. Customary work-up (recrystallization) gives 1,3,5-benzenetricarboxylic acid tris(cyclohexylamide).

Yield: 0.85 g (1.9 mmol): 62.5%.

Melting point: 371° C. (under simultaneous evaporation).

$^1$H-NMR (DMSO-d$_6$): δ=1.01-2.05 (m, 30H); 3.78 (m, 3H); 8.28 (s, 3H); 8.43 (d, J=7.9 Hz, 3H).

$^{13}$C-NMR (CF$_3$COOD/CDCl$_3$ 1:1): δ=24.9; 25.2; 32.3; 51.8; 130.7; 134.3; 168.0.

IR (KBr, cm$^{-1}$): 3264; 3077; 2932; 1650; 1542; 1258.

MS (70 eV). m/z: 453 (M$^+$, 46%).

The following compounds characterized by their melting points (m.p.) are analogously prepared. The melting point is determined in a combined TGA/DSC-instrument at a heating rate of 10 K/min.

Compound I-1: 1,3,5-benzenetricarboxylic acid tris(3-methylbutylamide); m.p.=263° C.**)

Compound I-2: 1,3,5-benzenetricarboxylic acid tris(cyclopentylamide); m.p.=388° C.**)

Compound I-3: 1,3,5-benzenetricarboxylic acid tris(1,2-dimethylpropylamide);*)

Compound I-4: 1,3,5-benzenetricarboxylic acid tris(cyclohexylamide); m.p.=376° C.**)

Compound I-5: 1,3,5-benzenetricarboxylic acid tris(tert-octylamide); m.p.=315° C.**)

Compound I-6: 1,3,5-benzenetricarboxylic acid tris(1,1-dimethylpropylamide);*)

Compound I-7: 1,3,5-benzenetricarboxylic acid tris(tert-butylamide);*)

Compound I-8: 1,3,5-benzenetricarboxylic acid tris(cyclohexylmethylamide); m.p.=313° C.

Compound I-9: 1,3,5-benzenetricarboxylic acid tris(isobutylamide); m.p.=292° C.**)

Compound I-10: 1,3,5-benzenetricarboxylic acid tris(2-methylcyclohexylamide); m.p.=414° C.**)

Compound I-11: 1,3,5-benzenetricarboxylic acid tris(1,1-dimethylpropylamide);*)

Compound I-12: 1,3,5-benzenetricarboxylic acid tris(isopropylamide);*)

Compound I-13: 1,3,5-benzenetricarboxylic acid tris(2-butylamide);*)

Compound I-14: 1,3,5-benzenetricarboxylic acid tris(1-adamantylamide);*)

Compound I-15: 1,3,5-benzenetricarboxylic acid tris(1-ethylpropylamide); m.p.=378° C.**)

Compound I-16: 1,3,5-benzenetricarboxylic acid tris(3,3,5-trimethylcyclohexylamide);*)

Compound I-17: 1,3,5-benzenetricarboxylic acid tris(4-methylcyclohexylamide);*)

Compound I-18: 1,3,5-benzenetricarboxylic acid tris(cyclobutylamide); m.p.=329° C.**)

Compound I-19: 1,3,5-benzenetricarboxylic acid tris(n-butylamide); m.p.=239° C.

Compound I-20: 1,3,5-benzenetricarboxylic acid tris(4-tert-butylphenylamide); m.p.=334° C.

Compound I-21: 1,3,5-benzenetricarboxylic acid tris(4-(trifluoromethoxy)phenylamide); m.p.=253° C.

Compound I-22: 1,3,5-benzenetricarboxylic acid tris(pentafluorophenylamide);*)

Compound I-23: 1,3,5-benzenetricarboxylic acid tris(2-ethylphenylamide); m.p.=309° C.

Compound I-24: 1,3,5-benzenetricarboxylic acid tris(2,4-dimethylphenylamide); m.p.=298° C.

Compound I-25: 1,3,5-benzenetricarboxylic acid tris(3,5-bis (triflouromethyl)phenylamide); m.p.=331° C.

Compound I-26: 1,3,5-benzenetricarboxylic acid tris(4-n-butylphenylamide); m.p.=232° C.

Compound I-27: 1,3,5-benzenetricarboxylic acid tris(cycloheptylamide); m.p.=394° C.**)

Compound I-28: 1,3,5-benzenetricarboxylic acid tris(R(−)-1-cyclohexylethylamide); m.p.=392° C.**)

Compound I-29: 1,3,5-benzenetricarboxylic acid tris(2,4,6-trimethylphenylamide); m.p.=369° C.***)

Compound I-30: 1,3,5-benzenetricarboxylic acid tris(4-methylphenylamide); m.p.=303° C.

Compound I-31: 1,3,5-benzenetricarboxylic acid tris(benzylamide); m.p.=242° C.**)

Compound I-32: 1,3,5-benzenetricarboxylic acid tris(cyclopropylamide);*)

Compound I-33: 1,3,5-benzenetricarboxylic acid tris(4-ethoxyphenylamide); m.p.=266° C.

Compound I-34: 1,3,5-benzenetricarboxylic acid tris(3-methylphenylamide); m.p.=252° C.

Compound I-35: 1,3,5-benzenetricarboxylic acid tris(phenylamide); m.p.=312° C.

Compound I-36: 1,3,5-benzenetricarboxylic acid tris(4-methoxyphenylamide); m.p.=277° C.

Compound I-37: 1,3,5-benzenetricarboxylic acid tris(2,3-dimethylphenylamide); m.p.=403° C.***)

Compound I-38: 1,3,5-benzenetricarboxylic acid tris(3,5-difluorophenylamide); m.p.=333° C.

Compound I-39: 1,3,5-benzenetricarboxylic acid tris(4-fluorophenylamide); m.p.=311° C.

Compound I-40: 1,3,5-benzenetricarboxylic acid tris(methylamide); m.p.=333° C.**)

Compound I-41: 1,3,5-benzenetricarboxylic acid tris(cyclododecylamide); m.p.=387**)

Compound I-42: 1,3,5-benzenetricarboxylic acid tris(2-methylphenylamide); m.p.=377***)

Compound I-43: 1,3,5-benzenetricarboxylic acid tris(3,5-dimethylphenylamide); m.p.=302° C.

Compound I-44: 1,3,5-benzenetricarboxylic acid tris(3,4-dimethylphenylamide);*)

Compound I-45: 1,3,5-benzenetricarboxylic acid tris(3-methylcyclohexylamide);*)

Compound I-46: 1,3,5-benzenetricarboxylic acid tris(cyclooctylamide);*)

Compound I-47: 1,3,5-benzenetricarboxylic acid tris(2,3-dimethylcyclohexylamide);*)

Compound I-48: 1,3,5-benzenetricarboxylic acid tris(S(+)-1-cyclohexylethylamide); m.p.=397° C.**)

*) No melting before sublimation/decomposition.

**) Melting with simultaneous evaporation under 100% weight loss.

***) Melting under decomposition.

The general procedures used in the Working Examples 1 to 4 are described below.

Mixing Procedure:

To 59.91 g of powdered polypropylene (ELF-Atochem (RTM); Appryl 3030BN1(RTM)) 90 mg of a powdered additive (0.15% by weight) or a powdered mixture of additives (total 0.15% by weight) is added, and tumble-mixed for 24 h in a glass container. In general, 4.5 g of this mixture are compounded at 239° C. in a small-scale, laboratory twin-screw, recirculating and corotating extruder, for example the MicroCompounder of DACA Instruments (RTM), for a period of about 4 min at a screw speed of 40 rpm, and subsequently collected at room temperature. The neat polypropylene is similarly treated to produce a blank control sample.

Differential Scanning Calorimetry (DSC):

A Perkin-Elmer DSC instrument (RTM) (Model DSC 7), operated in a dry nitrogen atmosphere, is used for the analysis of the crystallization behavior of the various mixtures and control samples, according to standard procedures. About 5 to 10 mg of sample is sealed into an aluminum cup, heated from 130° C. to 230° C. at a rate of 10° C./min, held at 230° C. for 5 min, and then subsequently cooled at a rate of 10° C./min to 50° C. The data represented as crystallization temperatures are the peak temperatures of the exotherms in the thermograms that are recorded upon cooling.

Thermo-Gravimetric Analysis (TGA), Differential Thermal Analysis (DTA):

An automated Netzsch TGA/DTA instrument (STA 409) (RTM) operated in nitrogen is used for the analysis of the thermal stability and the melting temperature. As melting temperatures the peak maximum of the endothermic transition are presented. About 10 mg of sample is placed into an aluminum oxide crucible and heated from 50° C. to 640° C. at a rate of 10° C./min.

Injection Molding:

The injection molding is performed with a MicroInjector (DACA Instruments (RTM)). About 3.0 g of the pelletized thread is placed under a nitrogen blanket in the barrel at 260° C. After the granulate is completely molten, the melt is injected into a polished mold with a pressure of about 8 bar. The mold temperature is 20° C. The collected test specimen has a diameter of 2.5 cm and a thickness of about 1.1-1.2 mm.

Optical Characterization (Transmission, Clarity, Haze):

Transmission, clarity and haze are measured with a haze-gard plus instrument (BYK, Gardner (RTM), illumination CIE-C) at room temperature. The haze-gard plus instrument conforms to ASTM D-1003. The transmission, clarity and haze values are measured between 12-24 hours after obtaining the samples by injection molding.

EXAMPLE 1

0.15 wt % of the compound of the formula (I) with $R_1$, $R_2$ and $R_3$ as indicated in Table 1 are added to the polypropylene resin, processed and characterized according to the above methods.

The crystallization temperature ($T_{cryst.}$), haze, clarity and transmission of the polypropylene composition according to the present invention are listed in Table 1 as well as the thickness of the test specimen (plate).

TABLE 1

| Compound No. | $R_1$, $R_2$, $R_3$ | $T_{cryst.}$ [° C.] | Thickness [mm] | Clarity [%] | Haze [%] | Transmission [%] |
|---|---|---|---|---|---|---|
| none | | 112.0 | 1.19 | 79.0 | 64.0 | 91.4 |
| I-1 | 3-Methylbutyl | 121.3 | 1.12 | 98.7 | 27.4 | 90.9 |
| I-2 | Cyclopentyl | 121.0 | 1.11 | 97.8 | 28.8 | 88.4 |

TABLE 1-continued

| Compound No. | $R_1, R_2, R_3$ | $T_{cryst.}$ [°C.] | Thickness [mm] | Clarity [%] | Haze [%] | Transmission [%] |
|---|---|---|---|---|---|---|
| I-3 | 1,2-Dimethylpropyl | 124.7 | 1.12 | 98.2 | 30.0 | 91.0 |
| I-4 | Cyclohexyl | 124.8 | 1.12 | 97.6 | 34.5 | 90.6 |
| I-5 | 1,1,3,3-Tetramethylbutyl | 124.3 | 1.11 | 98.9 | 35.8 | 88.8 |
| I-6 | 1,1-Dimethylpropyl | 126.7 | 1.13 | 97.7 | 36.2 | 87.9 |
| I-7 | tert-Butyl | 128.7 | 1.10 | 97.9 | 36.2 | 86.6 |
| I-8 | Cyclohexylmethyl | 123.0 | 1.12 | 98.8 | 36.6 | 90.2 |
| I-9 | 2-Methylpropyl (Isobutyl) | 118.2 | 1.08 | 98.5 | 37.1 | 91.6 |
| I-10 | 2-Methylcyclohexyl | 125.0 | 1.12 | 97.6 | 37.2 | 87.1 |
| I-11 | 1,1-Dimethylpropyl | 126.5 | 1.13 | 97.7 | 38.2 | 90.8 |
| I-12 | Isopropyl | 125.2 | 1.13 | 97.2 | 38.6 | 89.6 |
| I-13 | 2-Butyl | 124.9 | 1.14 | 97.3 | 39.9 | 90.9 |
| none | | 112.0 | 1.19 | 79.0 | 64.0 | 91.4 |
| I-14 | 1-Adamantyl | 127.4 | 1.13 | 97.0 | 40.0 | 88.6 |
| I-15 | 1-Ethylpropyl | 124.2 | 1.10 | 96.3 | 42.2 | 91.1 |
| I-16 | 3,3,5-Trimethylcyclohexyl | 122.3 | 1.11 | 94.7 | 44.5 | 87.4 |
| I-17 | 4-Methylcyclohexyl | 113.8 | 1.11 | 96.8 | 47.1 | 89.8 |
| I-18 | Cyclobutyl | 114.0 | 1.13 | 95.8 | 52.4 | 89.9 |
| I-19 | n-Butyl | 118.0 | 1.17 | 95.8 | 57.9 | 90.1 |
| I-20 | 4-Tert-butylphenyl | 127.0 | 1.17 | 94.8 | 60.6 | 90.1 |
| I-21 | 4-(trifluoromethoxy)phenyl | 110.5 | 1.14 | 85.4 | 60.7 | 89.6 |

EXAMPLE 2

0.15 wt % of a 1:1 mixture of the compounds of the formula (I) as indicated in Table 2 is added to polypropylene resin, processed and characterized according to the methods described above.

The crystallization temperature ($T_{cryst.}$), haze, clarity and transmission of the polypropylene composition according to the present invention are listed in Table 2 as well as the thickness of the test specimen (plate).

TABLE 2

| Mixture No. | Compounds (1:1 weight ratio) | $T_{cryst.}$ [°C.] | Thickness [mm] | Clarity [%] | Haze [%] | Transmission [%] |
|---|---|---|---|---|---|---|
| none | | 112.0 | 1.19 | 79.0 | 64.0 | 91.4 |
| 2a | Compounds I-2 and I-10 | 123.6 | 1.15 | 97.1 | 34.5 | 91.3 |
| 2b | Compounds I-7 and I-10 | 125.5 | 1.15 | 98.1 | 30.9 | 88.3 |
| 2c | Compounds I-2 and I-7 | 125.2 | 1.12 | 97.7 | 32.7 | 90.7 |
| 2d | Compounds I-2 and I-4 | 125.0 | 1.11 | 97.4 | 34.3 | 89.8 |

The results in the above table illustrate that binary mixtures of compounds of the formula (I), when added to polypropylene resin, may further improve the transmission (mixtures 2a to 2c) and/or clarity (mixtures 2b and 2d) and/or reduce haze (mixture 2b), when compared with the resin comprising only one compound of the formula (I).

EXAMPLE 3

0.15 wt % of a 1:1:1 mixture of the compounds of the formula (I) as listed in Table 3 is added to polypropylene resin, processed and characterized according to the above methods.

The crystallization temperature ($T_{cryst.}$), haze, clarity and transmission of the polypropylene composition according to the present invention are listed in Table 3 as well as the thickness of the test specimen (plate).

TABLE 3

| Mixture No. | Compounds (1:1:1 weight ratio) | $T_{cryst.}$ [°C.] | Thickness [mm] | Clarity [%] | Haze [%] | Transmission [%] |
|---|---|---|---|---|---|---|
| none | | 112.0 | 1.19 | 79.0 | 64.0 | 91.4 |
| 3a | Compounds I-2, I-7 and I-10 | 122.6 | 1.15 | 97.4 | 38.6 | 90.2 |
| 3b | Compounds I-2, I-4 and I-10 | 125.4 | 1.14 | 97.1 | 35.3 | 90.9 |
| 3c | Compounds I-2, I-4 and I-7 | 123.3 | 1.15 | 98.4 | 29.1 | 90.6 |

The results in the above table illustrate that ternary mixtures of compounds of the formula (I), when added to polypropylene resin, may even further improve the transmission (mixtures 3a and 3b), and/or clarity (mixture 3c) and/or reduce haze (mixture 3b) when compared with resin comprising only one or two compounds of the formula (I).

EXAMPLE 4

The thermal stability of the compounds indicated in Table 4 is determined by thermo-gravimetric analysis (TGA), according to the procedure described above. The results are listed in the table below.

TABLE 4

| Compound | Weight loss | | |
|---|---|---|---|
| | Onset | 5% | 10% |
| I-2 | 340° C. | 375° C. | 385° C. |
| I-4 | 334° C. | 372° C. | 384° C. |
| I-14 | 316° C. | 382° C. | 458° C. |
| I-10 | 361° C. | 407° C. | 412° C. |
| I-12 | 308° C. | 341° C. | 355° C. |
| I-13 | 317° C. | 347° C. | 358° C. |
| I-7 | 332° C. | 355° C. | 365° C. |

The data shown above illustrate the excellent thermal stability of the compounds of the formula (I).

The invention claimed is:

1. A compound of the formula (IB)

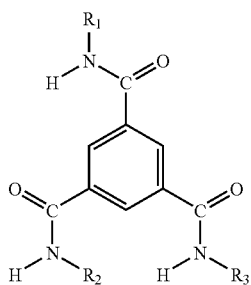

wherein

R$_1$, R$_2$ and R$_3$ are identical and are cyclopropyl, cyclobutyl, cycloheptyl, 1-adamantyl, 3-methylcyclohexyl, 2,3-dimethylcyclohexyl, 3,3,5-trimethylcyclohexyl, S(+)-1-cyclohexylethyl, R(+)-1-cyclohexylethyl, isopropyl, 1,1-dimethylpropyl, 1,2-dimethylpropyl, 2-butyl, 3-methylbutyl or 1,1,3,3-tetramethylbutyl.

2. A compound according to claim 1 wherein

R$_1$, R$_2$ and R$_3$ are identical and are 1,2-dimethylpropyl, 3-methylbutyl or 1,1,3,3-tetramethylbutyl.

* * * * *